(12) United States Patent
Jeong et al.

(10) Patent No.: US 7,242,452 B2
(45) Date of Patent: Jul. 10, 2007

(54) REFLECTIVE LIQUID CRYSTAL DISPLAY DEVICE AND FABRICATING METHOD THEREOF

(75) Inventors: Woo-Nam Jeong, Kyongsangbuk-do (KR); Hyun-Suk Jin, Kyonggi-do (KR); Yong-Jin Cho, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/420,786

(22) Filed: Apr. 23, 2003

(65) Prior Publication Data

US 2004/0021816 A1    Feb. 5, 2004

(30) Foreign Application Priority Data

Jul. 31, 2002    (JP)    .................... 10-2002-0045132

(51) Int. Cl.
*G02F 1/1343*    (2006.01)

(52) U.S. Cl. ...................... 349/145; 349/143

(58) Field of Classification Search ................ 349/113, 349/139, 143, 145–146
See application file for complete search history.

(56) References Cited

U.S. PATENT DOCUMENTS

| | | | |
|---|---|---|---|
| 5,075,674 A | 12/1991 | Katayama et al. | ............. 349/43 |
| RE33,829 E | 2/1992 | Castleberry | .................. 349/54 |
| 5,150,240 A * | 9/1992 | Kim | ............................. 349/43 |
| 5,408,345 A | 4/1995 | Mitsui et al. | .................. 359/59 |
| 5,953,088 A | 9/1999 | Hanazawa et al. | .......... 349/110 |
| 6,072,450 A | 6/2000 | Yamada et al. | |
| 6,219,118 B1 | 4/2001 | Zhang | ........................ 349/110 |
| 6,259,493 B1 | 7/2001 | Nakamura et al. | .......... 349/139 |
| 6,275,274 B1 * | 8/2001 | Kanemori et al. | ............. 349/42 |
| 6,504,593 B1 | 1/2003 | Noritake et al. | ............ 349/139 |
| 6,781,658 B1 | 8/2004 | Choi | .......................... 349/139 |
| 2004/0141112 A1 | 7/2004 | Kang | ......................... 349/155 |

FOREIGN PATENT DOCUMENTS

| | | |
|---|---|---|
| JP | 8-122823 | 5/1996 |
| JP | 10-253988 | 9/1998 |
| JP | 11-337961 | 12/1999 |
| JP | 11-352513 | 12/1999 |

* cited by examiner

*Primary Examiner*—Dung T. Nguyen
(74) *Attorney, Agent, or Firm*—Morgan, Lewis & Bockius LLP

(57) ABSTRACT

A reflective liquid crystal display device and a fabricating method thereof are disclosed in the present invention. The reflective liquid crystal display device includes a substrate having a pixel region, a gate line on the substrate, a thin film transistor connected to the gate line and the data line, the thin film transistor having a gate electrode, an active layer, and source and drain electrodes, first and second reflective electrodes connected to the drain electrode, the first and second reflective electrodes completely covering the data line and separated by a gap, and a data line crossing the gate line, wherein the data line has a bent shape including first, second, and third portions, and the first portion parallel to the gate line connects the second and third portions, and the second and third portions are formed under the first and second reflective electrodes, respectively.

18 Claims, 16 Drawing Sheets

REFLECTIVE LIQUID CRYSTAL DISPLAY DEVICE AND FABRICATING METHOD THEREOF

This application claims the benefit of the Korean Application No. P2002-045132 filed on Jul. 31, 2002, which is hereby incorporated by reference.

BACKGROUND OF THE INVENTION

1. Field of the Invention

The present invention relates to a liquid crystal display device, and more particularly, to a reflective liquid crystal display device and a fabricating method thereof. Although the present invention is suitable for a wide scope of applications, it is particularly suitable for improving a contrast ratio of a liquid crystal display device.

2. Discussion of the Related Art

Generally, liquid crystal display (LCD) devices are classified into two types depending upon the usage of a light source: a transmissive LCD device using a backlight and a reflective LCD device using an external natural and/or artificial light source. More than about two thirds of a total power are consumed for the backlight in the transmissive LCD device, whereas the power consumption is improved in the reflective LCD devices due to the absence of the backlight.

In the reflective LCD device, a black matrix is used to improve a contrast ratio. However, a contrast ratio is reduced as a black matrix reduces a reflective portion.

FIG. 1 is an expanded perspective view of a reflective liquid crystal display device according to a related art. In FIG. 1, first and second substrates 6 and 23 face into and are spaced apart from each other. A data line 17 and a gate line 5 are formed on the inner surface of the first substrate 6. Each of the data line 17 and the gate line 5 crosses each other and defines a pixel region "P". A thin film transistor (TFT) "T" is formed at each intersection between the data line 17 and the gate line 5. A pixel electrode (i.e., a reflective electrode 18) is formed at the pixel region "P". The reflective electrode 18 is formed of a conductive material such as aluminum (Al) having an excellent conductivity and reflectance, and an Al alloy. A black matrix 21 is formed on the inner surface of the second substrate 23 in a matrix form. A color filter layer 22 including sub-color filters 22a, 22b, and 22c is formed at an inner portion of the matrix corresponding to the pixel region "P". A transparent common electrode 24 is formed on the entire surface of the second substrate 23. A liquid crystal layer 20 is interposed between the first and second substrates 6 and 23.

The black matrix 21 is formed at regions corresponding to the data line 17, the gate line 5, and the thin film transistor "T". The black matrix 21 is designed in consideration of a misaligned margin during the attachment process of the first and second substrates 6 and 23. Accordingly, the area of the black matrix 21 is increased.

FIG. 2 is a schematic cross-sectional view taken along line II-II of FIG. 1. FIG. 3 is a magnified cross-sectional view of a portion "A" of FIG. 2.

As shown in FIGS. 2 and 3, a data line 17 is formed between adjacent pixel regions "P1" and "P2" on the inner surface of a first substrate 6. A black matrix 21 corresponding to the data line 17 and a color filter layer 22 including sub-color filters 22a, 22b, and 22c corresponding to the pixel regions "P1" and "P2" are formed on the inner surface of a second substrate 23. When a first distance between adjacent reflective electrodes 18 over the data line 17 is "a" and a second distance of the portion of the reflective electrodes 18 overlapping the data line 17 is "b", a width of the black matrix 21 becomes "a+2b". Since a uniform electric field is not sufficiently applied to a liquid crystal layer (not shown) corresponding to the first distance "a" unlike on the reflective electrode 18, light is leaked through the liquid crystal layer corresponding to the first distance "a" even when a voltage corresponding to a black state of the pixel region "P" is applied in a normally white mode. Therefore, the black matrix 21 should shield the region corresponding to the first distance "a". Furthermore, a value of "2b" corresponds to a misaligned margin during the attachment process of the first and second substrates 6 and 23. Therefore, the area of the black matrix 21 is increased, thereby decreasing an effective reflection area, which is not suitable for a reflective liquid crystal display device requiring high luminance.

In the reflective LCD device, as mentioned above, it is important to improve brightness and a contrast ratio because the ambient light reflected at the reflective electrode is used instead of the backlight to display images. The black matrix improving a contrast ratio may prevent the light leakage in the region corresponding to the data line. However, an overlapping region of the black matrix and the data line reduces an effective reflection area, thereby reducing the brightness.

SUMMARY OF THE INVENTION

Accordingly, the present invention is directed to a reflective liquid crystal display device and a fabricating method thereof that substantially obviate one or more of problems due to limitations and disadvantages of the related art.

Another object of the present invention is to provide a reflective liquid crystal display device for improving reduction in an effective reflection area due to a black matrix and for increasing brightness.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a reflective liquid crystal display device includes a substrate having a pixel region, a gate line on the substrate, a thin film transistor connected to the gate line and the data line, the thin film transistor having a gate electrode, an active layer, and source and drain electrodes, first and second reflective electrodes connected to the drain electrode, the first and second reflective electrodes completely covering the data line and separated by a gap, and a data line crossing the gate line, wherein the data line has a bent shape including first, second, and third portions, and the first portion parallel to the gate line connects the second and third portions, and the second and third portions are formed under the first and second reflective electrodes, respectively.

In another aspect of the present invention, a method for fabricating a reflective liquid crystal display device includes forming a gate line on a substrate, forming a data line crossing the gate line to define a pixel region, wherein the data line has a bent shape including first, second, and third portions, and the first portion parallel to the gate line connects the second and third portions, and the second and third portions are formed under the first and second reflective electrodes, respectively, forming a thin film transistor connected to the gate line and the data line, the thin film transistor comprising a gate electrode, an active layer, and source and drain electrodes, and forming first and second reflective electrodes connected to the drain electrode, the first and second reflective electrodes completely covering the data line and having a gap between the first and second reflective electrodes.

In another aspect of the present invention, a reflective liquid crystal display device includes a substrate including a pixel region, a gate line on the substrate, a thin film transistor connected to the gate line and the data line, the thin film transistor including a gate electrode, an active layer, and source and drain electrodes, first and second reflective electrodes electrically connected to the drain electrode, the first and second reflective electrodes completely covering the data line and having a first gap between the first and second reflective electrodes, and a data line crossing the gate line, the data line comprising first and second branch lines separated by a second gap formed under the first and second reflective electrodes, respectively.

In a further aspect of the present invention, a method for fabricating a reflective liquid crystal display device includes forming a gate line on a substrate, forming a data line on the substrate crossing the gate line and defining a pixel region, the data line comprising first and second branch lines separated by a first gap, forming a thin film transistor connected to the gate line and the data line, the thin film transistor comprising a gate electrode, an active layer, and source and drain electrodes, and forming first and second reflective electrodes connected to the drain electrode, the first and second reflective electrodes completely covering the data line and having a second gap between the first and second reflective electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

In a reflective liquid crystal display (LCD) device according to the present invention, a black matrix is eliminated or reduced by modifying a data line to minimize a reduction in an effective reflection area due to an overlapping portion of the black matrix and the data line.

Figure 1:
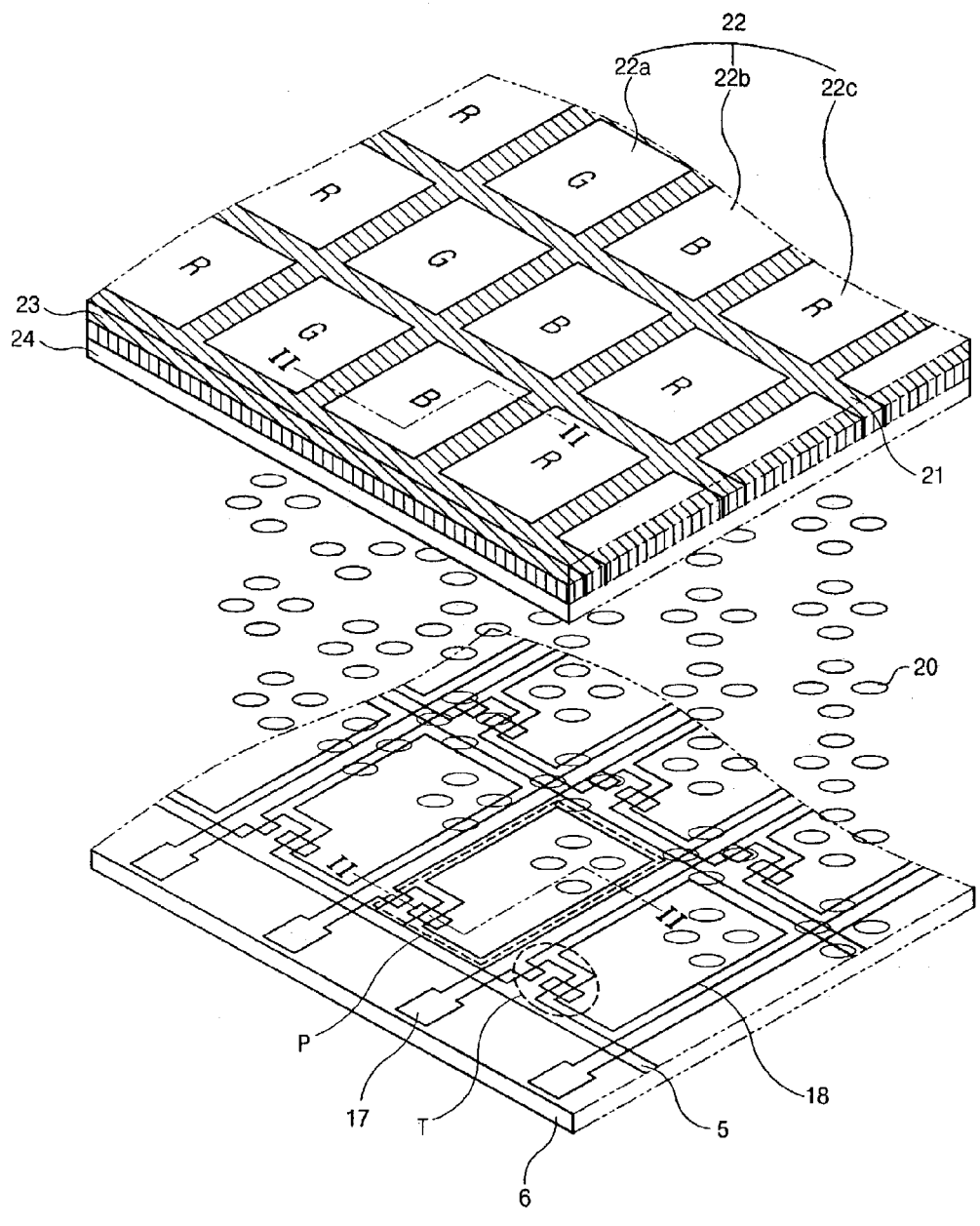
FIG. 1 is an expanded perspective view of a reflective liquid crystal display device according to a related art.
Figure 2:
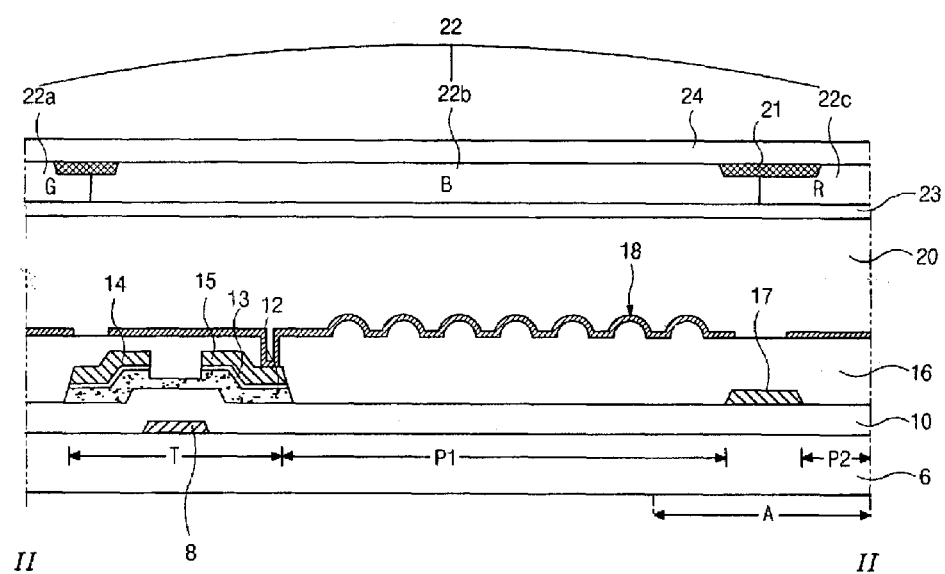
FIG. 2 is a schematic cross-sectional view taken along line II-II of FIG. 1.
Figure 3:
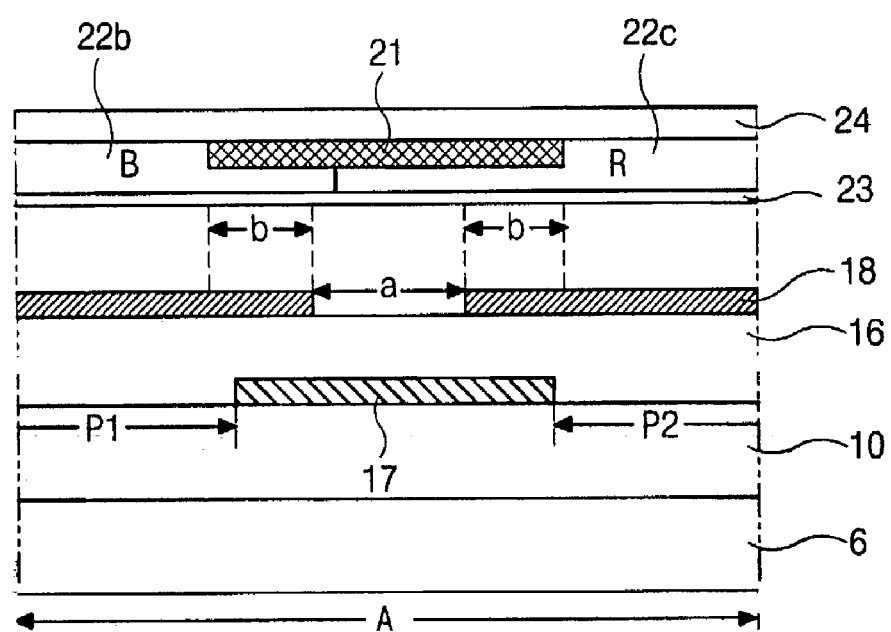
FIG. 3 is a magnified cross-sectional view of portion "A" of FIG. 2.
Figure 4:
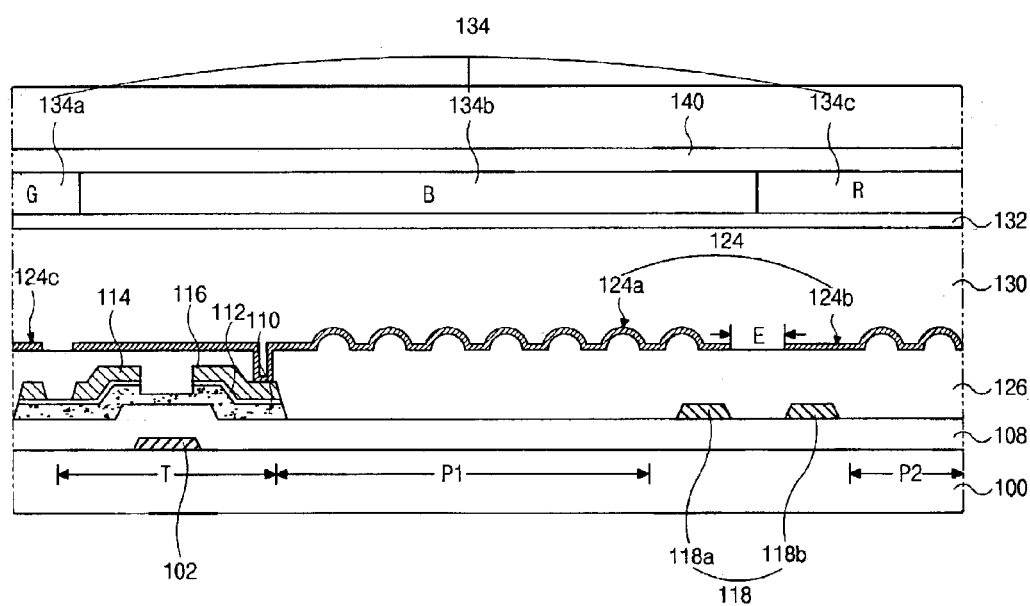
FIG. 4 is a schematic cross-sectional view of a reflective liquid crystal display device according to a first embodiment of the present invention.

FIG. 4 is a schematic cross-sectional view of a reflective liquid crystal display device according to a first embodiment of the present invention.

In FIG. 4, first and second substrates 100 and 140 face into and spaced apart from each other. A thin film transistor (TFT) "T", a data line 118, and a gate line (not shown) are formed on the inner surface of the first substrate 100. The thin film transistor "T" has a gate electrode 102, an active layer 110, and source and drain electrodes 114 and 116. The data line 118 and the gate line are connected to the source electrode 114 and the gate electrode 102, respectively. A plurality of pixel regions "P1" and "P2" are defined by the gate line and the data line 118 crossing each other. A passivation layer 126 is formed on the thin film transistor "T" and the data line 118. Adjacent reflective electrodes 124a and 124b are formed on the passivation layer 126 at the adjacent pixel regions "P1" and "P2", respectively. The reflective electrode 124a is connected to the drain electrode 116. The reflective electrode 124a may have an uneven shape in order to increase the brightness. Generally, an uneven pattern is formed on the upper surface of the passivation layer 126, and the reflective electrode 124a have the uneven shape due to the uneven pattern of the passivation layer 126. In the above structure, the data line 118 is divided into first and second branch lines 118a and 118b at one end of the lower substrate 100. The first and second branch lines 118a and 118b are formed and extended under the adjacent reflective electrodes 124a and 124b, respectively.

A color filter layer 134 including red, green, and blue sub-color filters 134a, 134b, and 134c is formed on the inner surface of the second substrate 140 facing into the lower substrate 100. Each sub-color filter 134a, 134b, and 134c corresponds to each pixel region "P1" and "P2". A transparent common electrode 132 is formed on the color filter layer 134.

In the above-described reflective liquid crystal display device, the ambient light is reflected at the adjacent reflective electrodes 124a and 124b and, at the same time, transmitted through a space between the first and second branch lines 118a and 118b. Unlike the related art structure, light leakage does not occur at region "E" between the adjacent reflective electrodes 124a and 124b (region "E"). Accordingly, a black matrix (not shown) is not required to be formed on the portion corresponding to the adjacent reflective electrodes 124a and 124b. Consequently, since a black matrix is formed only at a portion corresponding to the gate line, an effective area of the black matrix can be reduced, and high brightness and a high contrast ratio can be obtained.

Figure 5:
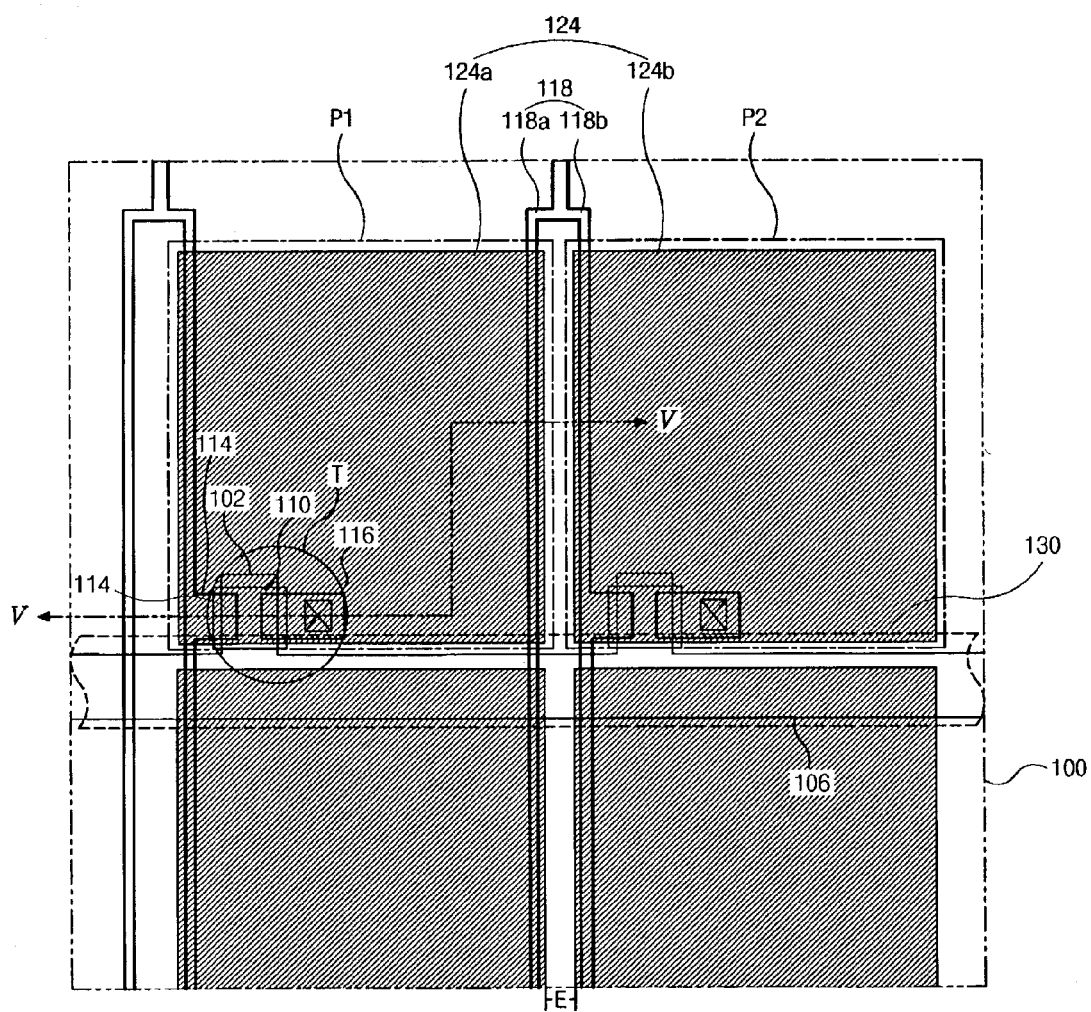
FIG. 5 is a schematic plane view illustrating an array substrate for the reflective liquid crystal display device according to the first embodiment of the present invention.

FIG. 5 is a schematic plane view illustrating the array substrate for the reflective liquid crystal display device according to the first embodiment of the present invention.

As shown in FIG. 5, a gate line 106 and a data line 118 cross each other defining adjacent pixel regions "P1" and "P2". A thin film transistor (TFT) "T" including a gate electrode 102, an active layer 110, and source and drain electrodes 114 and 116 is disposed at the intersection of the gate line 106 and the data line 118. The gate electrode 102 and the source electrode 114 are connected to the gate line 106 and the data line 118, respectively. Herein, the source and drain electrodes 114 and 116 are spaced apart from each other. Adjacent reflective electrodes 124a and 124b are formed in the adjacent pixel regions "P1" and "P2", respectively. Reflective electrode 124b is connected to the drain electrode 116.

The data line 118 is divided into a first branch line 118a and a second branch line 118b at one end of the first substrate 100. The first and second branch lines 118a and 118b are formed and extended under the adjacent reflective electrodes 124a and 124b, respectively. Considering electrical resistance, the data line is designed to have the total of widths of the first and second branch lines 118a and 118b to be the same as the width of the data line of the related art reflective LCD device.

Since there is no data line in the region "E" between the adjacent reflective electrodes 124a and 124b, it is not required to form a black matrix on a portion corresponding to the region "E" between the adjacent reflective electrodes 124a and 124b on a second substrate (not shown). Accordingly, a black matrix 130 is formed only on a second portion of the gate line 106 on the second substrate.

FIGS. 6A to 6D, which are taken along line VI-VI of FIG. 5, are cross-sectional views illustrating the process steps of fabricating the array substrate for the reflective liquid crystal display device of FIG. 5.

Figure 6A:
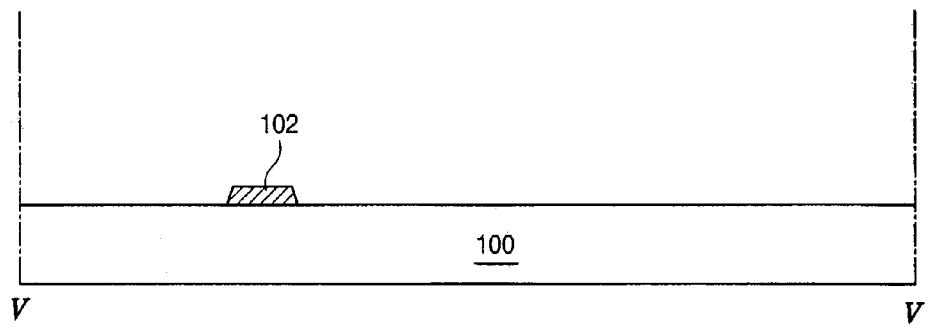
FIGS. 6A to 6D are schematic cross-sectional views taken along line VI-VI of FIG. 5 to illustrate the process steps of fabricating the array substrate for the reflective liquid crystal display device according to the first embodiment of the present invention.

In FIG. 6A, a gate electrode 102 and a gate line 106 (shown in FIG. 5) are formed on a substrate 100. The gate electrode 102 and the gate line 106 (shown in FIG. 5) are formed of aluminum (Al) having a low electrical resistance in order to reduce a resistance-capacitance (RC) delay. Pure aluminum has a low chemical resistance and causes line defects due to a hillock phenomenon during a later high-temperature process. Thus, a multi-layered structure including an aluminum layer such as aluminum/molybdenum (Al/Mo) can be used as the gate electrode 102 and the gate line 106 (shown in FIG. 5).

Figure 6B:
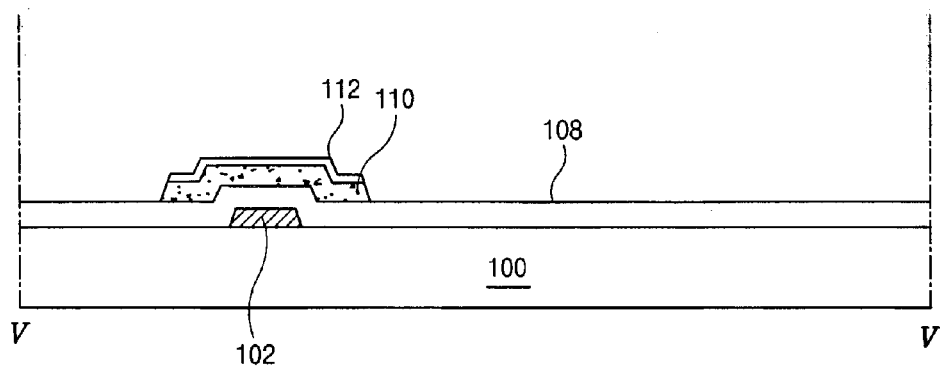

As shown in FIG. 6B, a gate insulating layer 108 is formed on the gate electrode 102 and the gate line 106 (shown in FIG. 5), which are formed on the entire surface of the substrate 100, by depositing an inorganic insulating material, such as silicon nitride ($SiN_x$) and silicon oxide ($SiO_2$). Subsequently, an active layer 110 formed of amorphous silicon (a-Si:H) and an ohmic contact layer 112 formed of impurity-doped amorphous silicon (n+a-Si:H) are sequentially formed on the gate insulating layer 108 over the gate electrode 102.

Figure 6C:
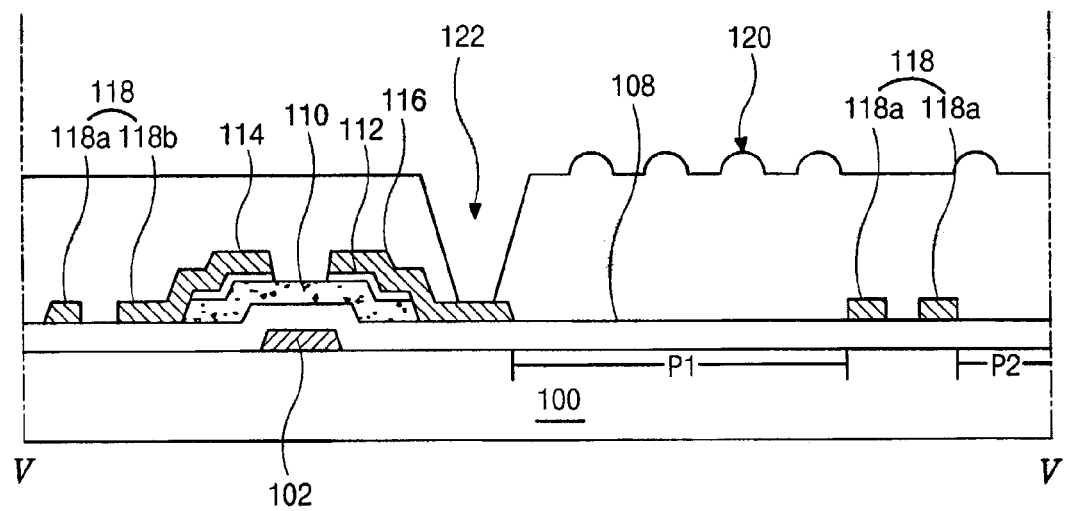

In FIG. 6C, a source electrode 114 and a drain electrode 116 are formed on the ohmic contact layer 112 by depositing and patterning a conductive metallic material, such as chromium (Cr), molybdenum (Mo), antimony (Sb), and titanium (Ti). At the same time, a data line 118 connected to the source electrode 114 is formed on the gate insulating layer 108. Crossing over a gate line 106 (shown in FIG. 5), the data line 118 defines adjacent pixel regions "P1" and "P2". Moreover, the data line 118 is divided into first and second branch lines 118a and 118b at one end of the substrate 100. The first and second branch lines 118a and 118b are formed at the adjacent pixel regions "P1" and "P2", respectively, to be extended in the perpendicular direction.

A passivation layer 120 is formed on the source and drain electrodes 114 and 116, and the data line 118 by depositing an organic insulating material, such as benzocyclobutene (BCB) and acrylic resin. Sequentially, a drain contact hole 122 exposing a portion of the drain electrode 116 is formed by etching the passivation layer 120. The upper surface of the passivation layer 120 has an uneven top surface having concave and convex structures.

Figure 6D:
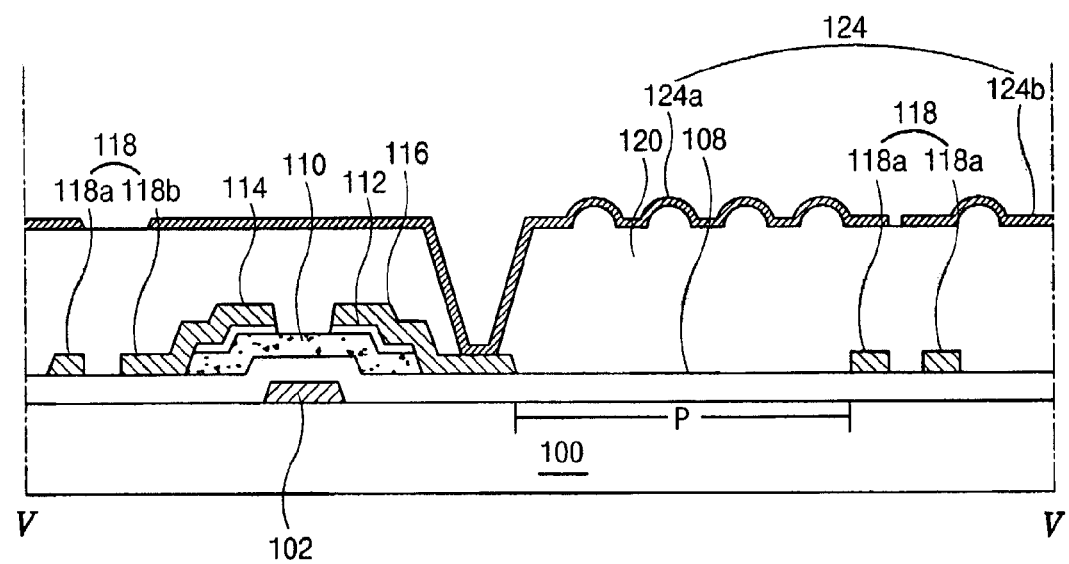

In FIG. 6D, adjacent reflective electrodes 124a and 124b are formed at the adjacent pixel regions "P1" and "P2", respectively. Reflective electrode 124b is connected to the drain electrode 116. The reflective electrode 124 may be formed of a conductive and reflective metallic material, such as aluminum and an aluminum alloy. The reflective electrode 124 has an uneven shape because it is formed on the uneven structure of the passivation layer 120 so as to obtain a high reflectance.

Figure 7A:
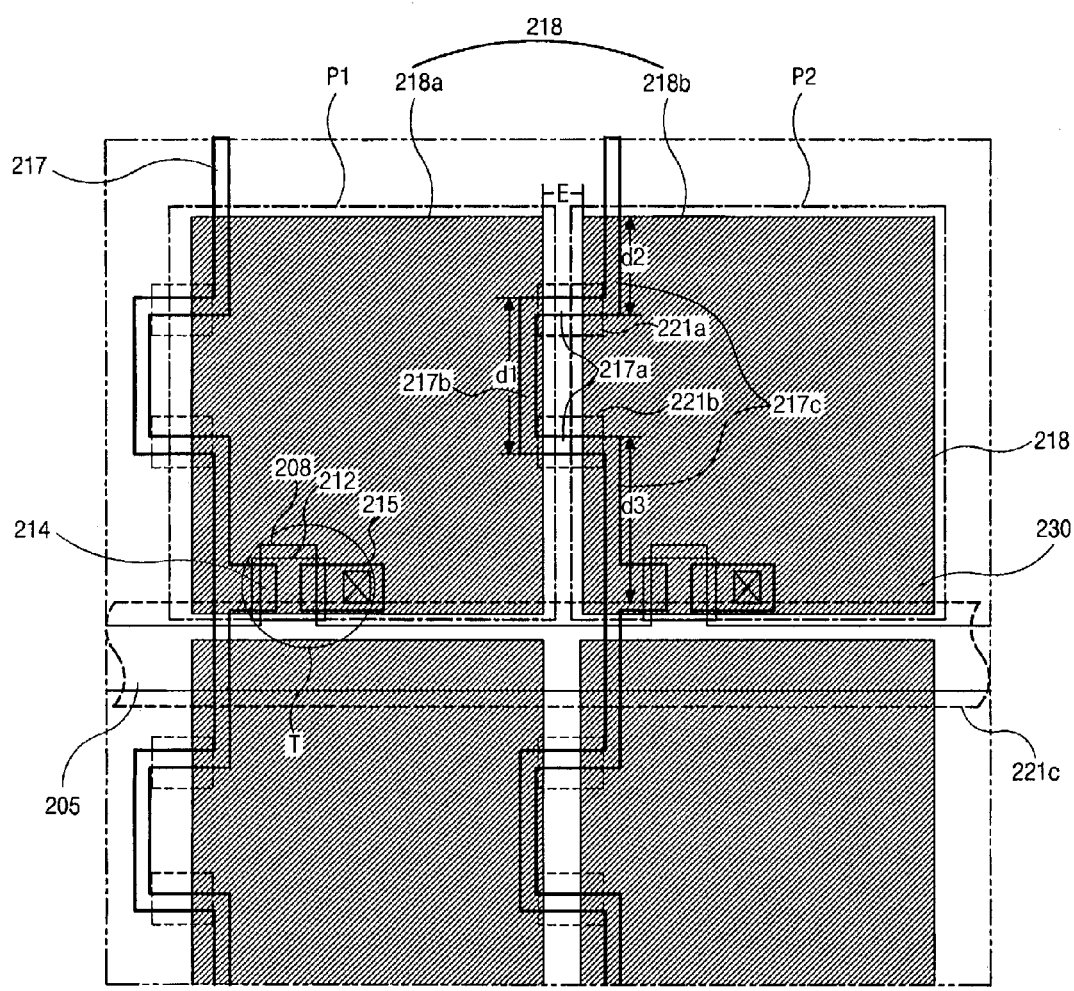
FIGS. 7A and 7B are schematic plane views showing an array substrate for a reflective liquid crystal display device according to a second embodiment of the present invention.
Figure 7B:
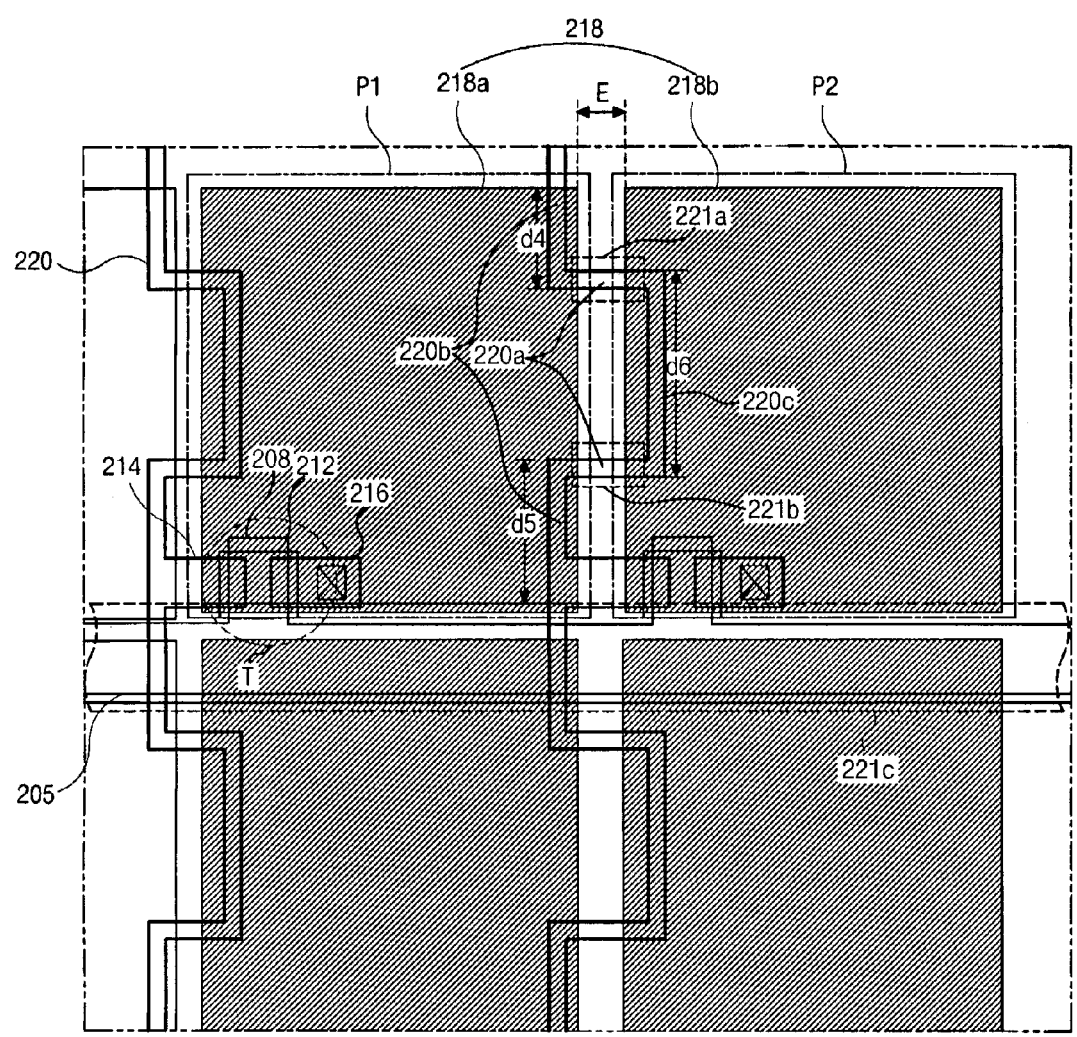

FIGS. 7A and 7B are schematic plane views showing an array substrate for a reflective liquid crystal display device according to a second embodiment of the present invention.

In FIG. 7A, a gate line 205 and a data line 217 cross each other defining adjacent pixel regions "P1" and "P2". A thin film transistor (TFT) "T" having a gate electrode 208, an active layer 212, and source and drain electrodes 214 and 215 is disposed at the intersection of the gate line 205 and the data line 217. The gate electrode 208 and the source electrode 214 are connected to the gate line 205 and the data line 217, respectively. Herein, the source and drain electrodes 214 and 215 are spaced apart from each other. Adjacent reflective electrodes 218a and 218b are formed in the adjacent pixel regions "P1" and "P2", respectively. Reflective electrode 218a is connected to the drain electrode 215.

The data line 217 has a bent shape including first, second, and third portions 217a, 217b, and 217c. The first portion 217a parallel to the gate line 205 connects the second and third portions 217b and 217c. The second and third portions 217b and 217c are formed under the adjacent reflective electrodes 218a and 218b, respectively. The second portion 217b has the same area as the third portion 217c to disperse and minimize an effect on the reflective electrode 218 by a polarity ("+" or "−") of a signal flowing through the data line 217. Since the second portion 217b has the same width as the third portion 217c, a length "$d_1$" of the second portion 217b is equal to a length "$d_2+d_3$" of the third portion 217c. A black matrix 221a, 221b, and 221c is formed to cover the first portion 217a at region "E" between the adjacent reflective electrodes 218a and 218b and the gate line 205. Since the first portion 217a at the region "E" between the adjacent reflective electrodes 218a and 218b has a small area, the black matrix 221a and 221b over the first portion 217a can be eliminated. Therefore, an area of the black matrix is reduced so that an effective reflection area can be enlarged.

FIG. 7B is a schematic plane view illustrating an array substrate for a reflective liquid crystal display device according to a variation of the second embodiment of the present invention.

In FIG. 7B, a gate line 205 and a data line 220 cross each other defining adjacent pixel regions "P1" and "P2". A thin film transistor (TFT) "T" having a gate electrode 208, an active layer 212, and source and drain electrodes 214 and 216 is disposed at the intersection of the gate line 205 and the data line 220. The gate electrode 208 and the source electrode 214 are connected to the gate line 205 and the data line 220, respectively. The source and drain electrodes 214 and 216 are spaced apart from each other. Adjacent reflective electrodes 218a and 218b are formed at the adjacent pixel regions "P1" and "P2", respectively. Reflective electrode 218a is connected to the drain electrode 215.

The data line 220 has a bent shape including first, second and third portions 220a, 220b, and 220c, wherein the bent portion forms a right angle (90°). The first portion 220a parallel to the gate line 205 connects the second and third portions 220b and 220c. The second and third portions 220b and 220c are formed under the adjacent reflective electrodes 218a and 218b, respectively. The second portion 220b has the same area as the third portion 220c to disperse and minimize an effect on the reflective electrode 218 by a polarity ("+" or "−") of a signal flowing through the data line 220. Since the second portion 220b has the same width as the third portion 220c, a length "$d_4+d_5$" of the second portion 220b is equal to a length "$d_6$" of the third portion 220c. A black matrix 221a, 221b, and 221c is formed to cover the first portion 220a at region "E" between the adjacent reflective electrodes 218a and 218b and the gate line 205. Since the first portion 220a at the region "E" between the adjacent reflective electrodes 218a and 218b has a small area, the black matrix 221a and 221b over the first portion 220a can be eliminated. Therefore, an area of the black matrix is reduced so that an effective reflection area can be enlarged.

Alternatively, the data line can be alternately formed at a plurality of pixel regions. In this case, the data line has first, second, and third portions and the number of each of the first, second, and third portions is one.

Figure 8:
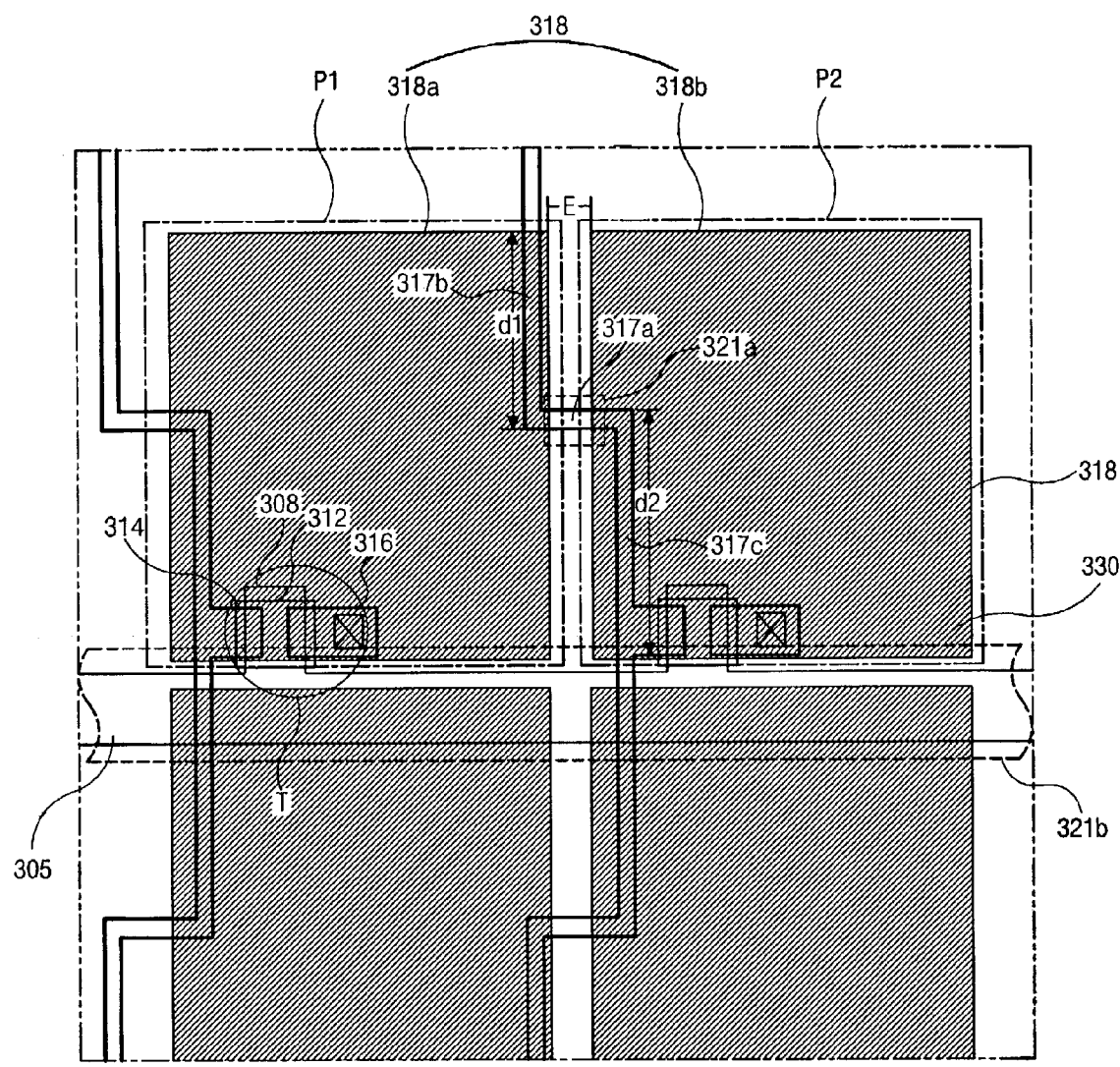
FIG. 8 is a schematic plane view showing an array substrate for a reflective liquid crystal display device according to a third embodiment of the present invention.

FIG. 8 is a schematic plane view illustrating an array substrate for a reflective liquid crystal display device according to a third embodiment of the present invention.

In FIG. 8, a gate line 305 and a data line 317 cross each other defining adjacent pixel regions "P1" and "P2". A thin film transistor (TFT) "T" having a gate electrode 308, an active layer 312, and source and drain electrodes 314 and 316 is disposed at the intersection of the gate line 305 and the data line 317. The gate electrode 308 and the source electrode 314 are connected to the gate line 305 and the data line 317, respectively. The source and drain electrodes 314 and 316 are spaced apart from each other. Adjacent reflective electrodes 318a and 318b are formed at the adjacent pixel regions "P1" and "P2", respectively. Reflective electrode 318a is connected to the drain electrode 316.

The data line 317 has a bent shape including first, second, and third portions 317a, 317b, and 317c, wherein the bent portion forms a right angle (90°). The first portion 317a parallel to the gate line 305 connects the second and third portions 317b and 317c. The second and third portions 317b and 317c are formed under the adjacent reflective electrodes 318a and 318b, respectively. The second portion 317b has the same area as the third portion 317c to disperse and minimize an effect on the reflective electrode 318 by a polarity ("+" or "−") of a signal flowing through the data line 317. Since the second portion 317b has the same width as the third portion 317c, a length "$d_1$" of the second portion 317b is equal to a length "$d_2$" of the third portion 317c. A black matrix 321a and 321b is formed to cover the first portion 317a at region "E" between the adjacent reflective electrodes 318a and 318b and the gate line 305. Since the first portion 317a at the region "E" between the adjacent reflective electrodes 318a and 318b has a small area, the black matrix 321a over the first portion 317a can be eliminated. Therefore, an area of the black matrix is reduced so that an effective reflection area can be enlarged.

Alternatively, the data line can be alternately formed at a plurality of pixel regions. In this case, the data line has first, second, and third portions and the number of each of the first, second, and third portions is one.

Figure 9:
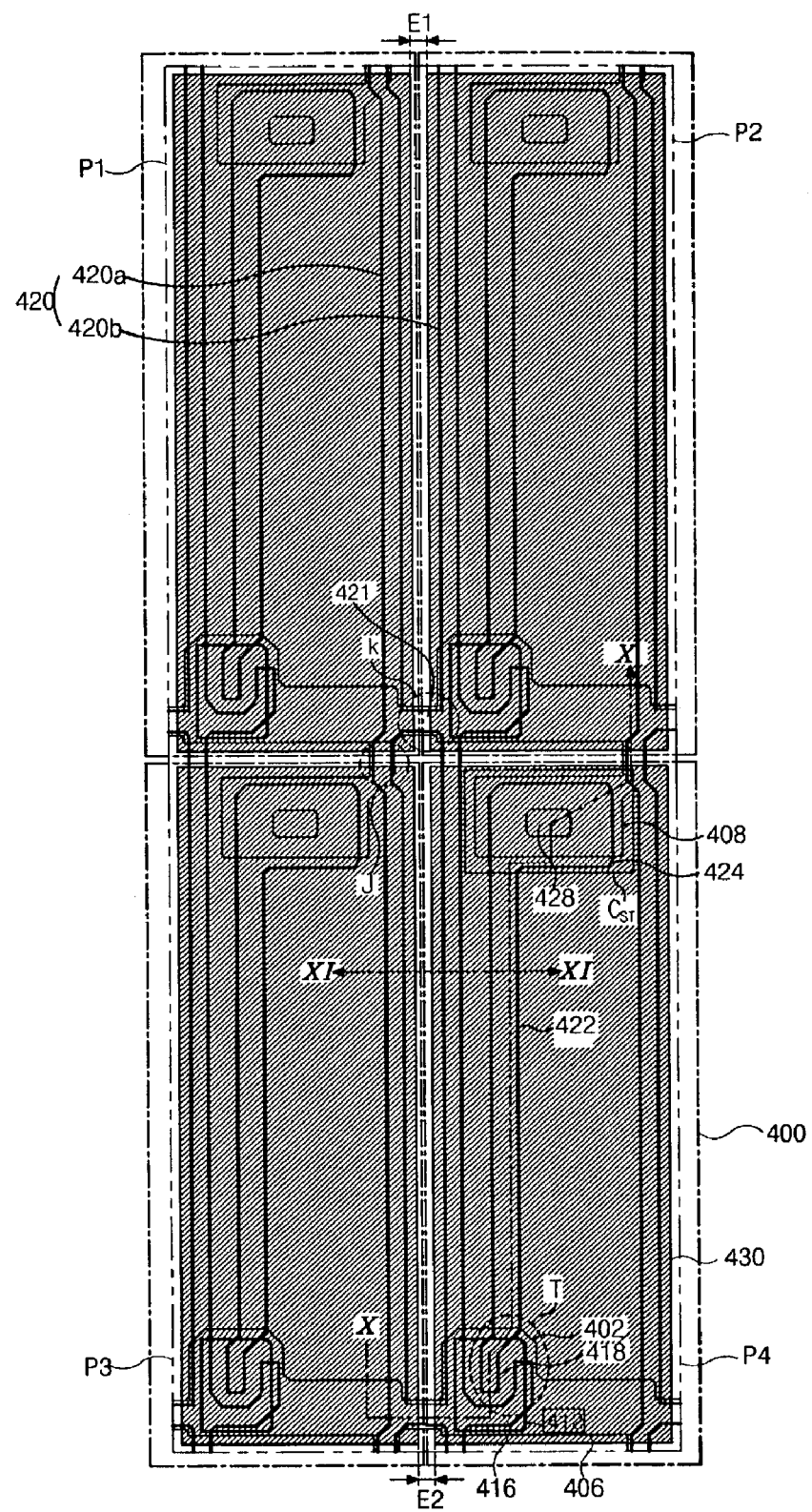
FIG. 9 is a schematic plane view showing an array substrate for a reflective liquid crystal display device according to a fourth embodiment of the present invention.

FIG. 9 is a schematic plane view showing an array substrate for a reflective liquid crystal display device according to a fourth embodiment of the present invention.

In FIG. 9, a gate line 406 and a data line 420 are formed on a first substrate 400. The gate line 406 and the data line 420 cross each other defining first, second, third, and fourth pixel regions "P1", "P2", "P3", and "P4". The widths of a first region "E1" between the first and second pixel regions "P1" and "P2" and a second region "E2" between the third and fourth pixel regions "P3" and "P4" are minimized. The data line 420 is divided into first and second branch lines 420a and 420b at one end of the first substrate 400. The first branch line 420a is disposed at the first and third pixel regions "P1" and "P3", and the second branch line 420b is disposed at the second and fourth pixel regions "P2" and "P4". The first and second branch lines 420a and 420b are connected to each other through a connection pattern 421. The connection pattern 421 is formed over the gate line 406 at the intersecting region "K" of the gate line 406 and the data line 420. The gate line 406 may have a minimum width at the intersecting region "K".

The gate line 406 has first and second protrusions 402 and 408. The first protrusion 402 extending to the first and second pixel regions "P1" and "P2" is used as a gate electrode, and the second protrusion 408 extending to the third and fourth pixel regions "P3" and "P4" is used as a first capacitor electrode of a storage capacitor "$C_{ST}$". The first branch line 420a is disposed to pass over a connecting region "J" between the gate line 406 and the first capacitor electrode 408.

A thin film transistor (TFT) "T" including the gate electrode 402, an active layer 412, and source and drain electrodes 416 and 418 is disposed at the intersection of the gate line 406 and the second branch line 420b. The source electrode 416 connected to the second branch line 420b is spaced apart from the drain electrode 418. The drain electrode 418 has a third protrusion 424 extending over the first capacitor electrode 408 through an extended portion 422 at each pixel region "P1", "P2", "P3", and "P4". The third protrusion 424 is used as a second capacitor electrode of a storage capacitor. Accordingly, the first and second capacitor electrodes 408 and 424 form the storage capacitor "$C_{ST}$" with an insulating layer (not shown) interposed between the first and second capacitor electrodes 408 and 424.

A reflective electrode 430 is formed at each pixel region "P1", "P2", "P3", and "P4". Since the reflective electrode 430 is connected to the second capacitor electrode 424, image signals are supplied to the reflective electrode 430 from the drain electrode 418. The reflective electrode 430 completely covers the data line 420, the gate line 406, and the gate electrode 402. Since the data line 420 is formed under the reflective electrode 430 spaced apart at each pixel region, the black matrix covering the light reflected from the data line is not required. If the first branch line 420a is not disposed at the connecting region "J" between the gate line 406 and the data line 420 and the connection pattern 421 is not disposed at the intersecting region "K" of the gate line 406 and the data line 420, an additional black matrix corresponding to the exposed first branch line 420a and the exposed connection pattern 421 should be formed on a second substrate (not shown) to prevent light leakage. The first branch line 420a at the connecting region "J" and the connection pattern 421 at the intersecting region "K" are exposed. However, the exposed areas of the first branch line 420a and the connection pattern 421 are small, so that a black matrix corresponding to the exposed first branch line 420a and the exposed connection pattern 421 is not required. Accordingly, high luminance and a high aperture ratio can be obtained. Although an overlapping portion of the first branch line 420a and the first capacitor electrode 408 at the connecting region "J" may vary a capacitance of the storage capacitor "$C_{ST}$", the variation of the capacitance can be minimized in a small-sized reflective liquid crystal display device.

FIGS. 10A to 10E, which are taken along line X-X of FIG. 9. FIGS. 11A to 11D, which are taken along line XI-XI of FIG. 9, are cross-sectional views illustrating the process steps of fabricating the array substrate for the reflective liquid crystal display device according to the fourth embodiment of the present invention.

Figure 10A:
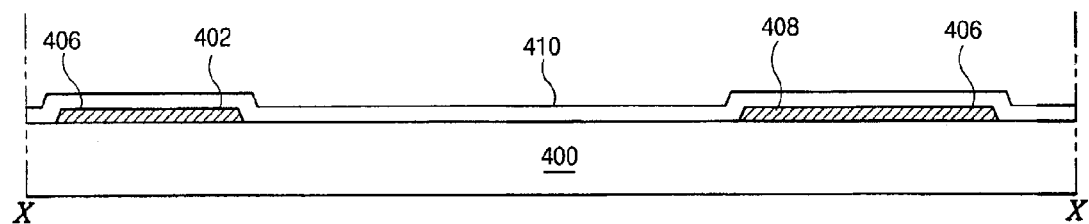
FIGS. 10A to 10E are schematic cross-sectional views taken along line X-X of FIG. 9 to illustrate the process steps of fabricating the array substrate for the reflective liquid crystal display device according to the fourth embodiment of the present invention.
Figure 11A:
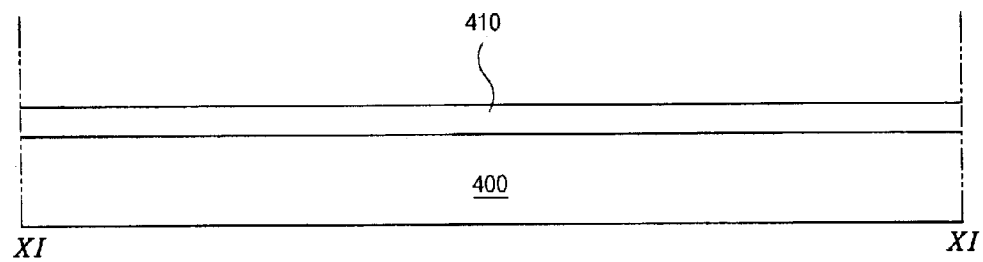
FIGS. 11A to 11D are schematic cross-sectional views taken along line XI-XI of FIG. 9 to illustrate the process steps of fabricating the array substrate for the reflective liquid crystal display device according to the fourth embodiment of the present invention.

In FIGS. 10A and 11A, a gate line 406, a gate electrode 402, and a first capacitor electrode 408 are formed on a first substrate 400. The gate electrode 402 is a first protrusion extending from the gate line 406, and the first capacitor electrode 408 is a second protrusion extending from the gate line 406. The gate line 406, the gate electrode 402, and the first capacitor electrode 408 are formed of aluminum (Al) having a low electrical resistance in order to reduce a resistance-capacitance (RC) delay. Pure aluminum has a low chemical resistance and causes line defects due to a hillock phenomenon during a later high-temperature process. Thus, a multi-layered structure including aluminum layer such as aluminum/molybdenum (Al/Mo) can be used as the gate line 406, the gate electrode 402, and the first capacitor electrode 408. As shown in FIG. 10A, a gate insulating layer 410 is formed on the gate line 406, the gate electrode 402, and the first capacitor electrode 408 by depositing an inorganic insulating material, such as silicon nitride ($SiN_x$) and silicon oxide ($SiO_2$)

Figure 10B:
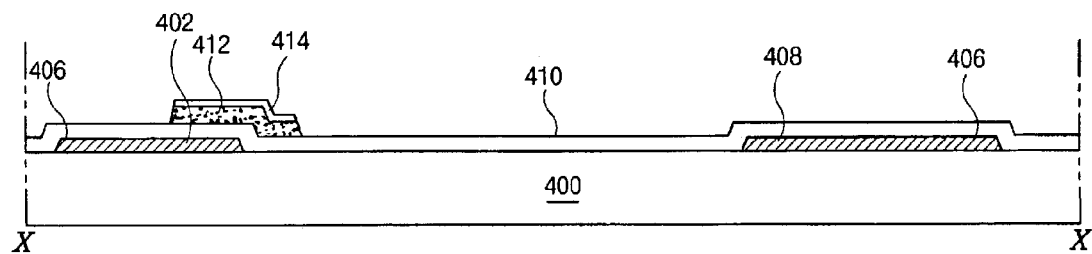

In FIG. 10B, an active layer 412 of amorphous silicon (a-Si:H) and an ohmic contact layer 414 of impurity-doped amorphous silicon (n+a-Si:H) are sequentially formed on the gate insulating layer 410 over the gate electrode 402.

Figure 10C:
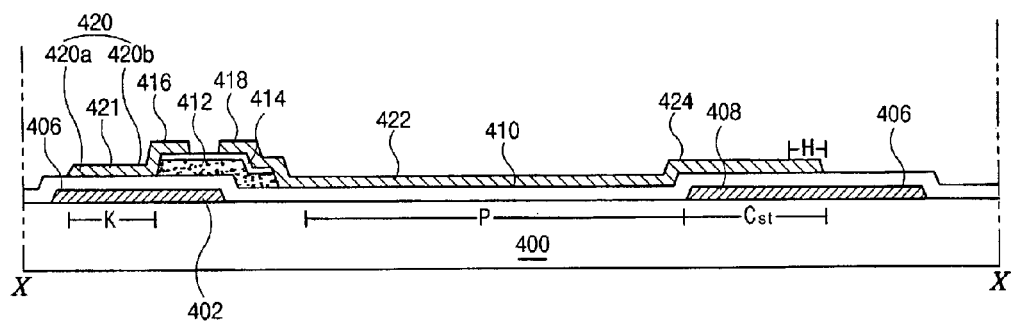
Figure 11B:
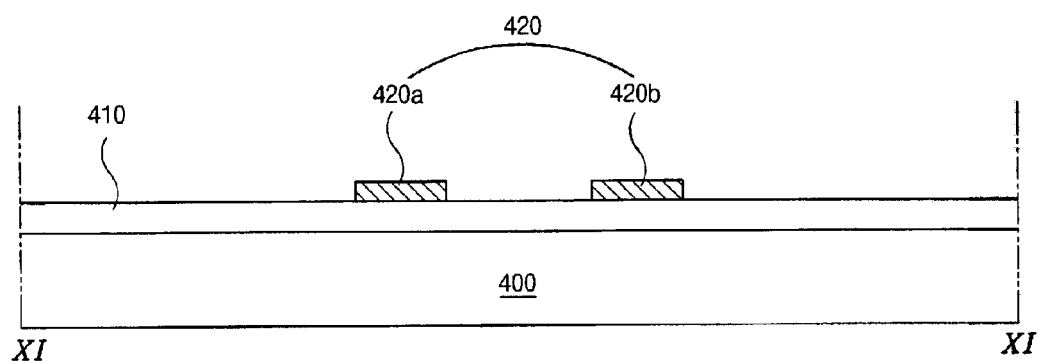

In FIGS. 10C and 11B, source and drain electrodes 416 and 418 are formed on the ohmic contact layer 414 by depositing and patterning a conductive metallic material, such as chromium (Cr), molybdenum (Mo), antimony (Sb), and titanium (Ti). At the same time, a data line 420 connected to the source electrode 416 is formed on the gate insulating layer 410. The data line 420 defines adjacent pixel regions "P3" and "P4" with the gate line 406. Moreover, an extended portion 422 and a second capacitor electrode 424 are formed on the gate insulating layer 410. The second capacitor electrode 424 is formed over the first capacitor electrode 408, and the extended portion 422 connects the second capacitor electrode 424 and the drain electrode 418. The first and second capacitor electrodes 408 and 424 form a storage capacitor "$C_{ST}$" with an insulating layer 410 interposed between the first and second capacitor electrodes 408 and 424.

The data line 420 is divided into first and second branch lines 420a and 420b at one end of the substrate 400. The first and second branch lines 420a and 420b are connected to each other through a connection pattern 421 at an intersecting region "K" of the gate line 406 and the data line 420. The connection pattern 421 is formed to overlap the gate line 406. The first branch line 420a is disposed at a connecting region "J" between the gate line 406 and the first capacitor electrode 408. Since the area of the first branch line 420a at the connecting region "J" and the connection pattern 421 at the intersecting region "K" is small, a black matrix corresponding to the first branch line 420a and the connection pattern 421 is not required.

Figure 10D:
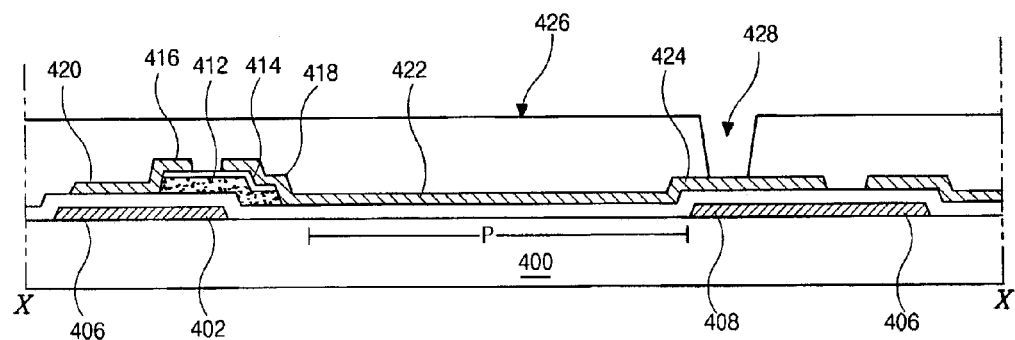
Figure 11C:
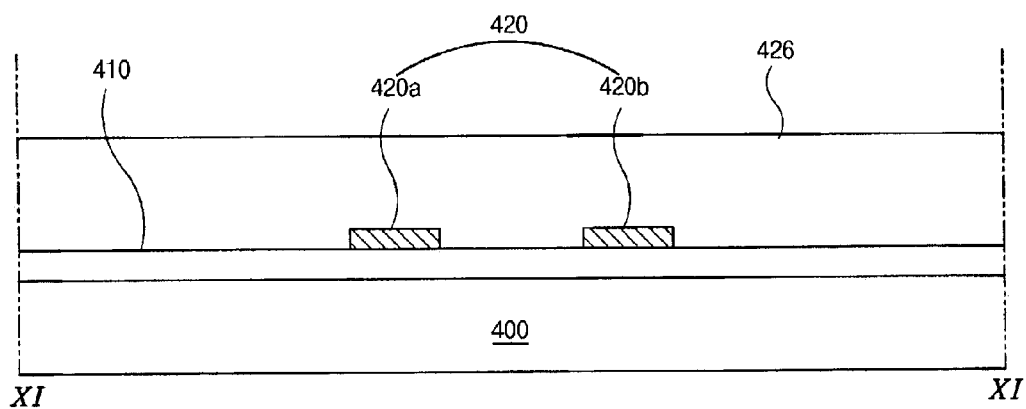

In FIGS. 10D and 11C, a passivation layer 426 is formed on the source electrode 416, the drain electrode 418, the data line 420, and the second capacitor electrode 424 by depositing an organic insulating material, such as benzocyclobutene (BCB) and acrylic resin. Sequentially, a capacitor contact hole 428 exposing a portion of the second capacitor electrode 424 is formed by etching the passivation layer 426.

Figure 10E:
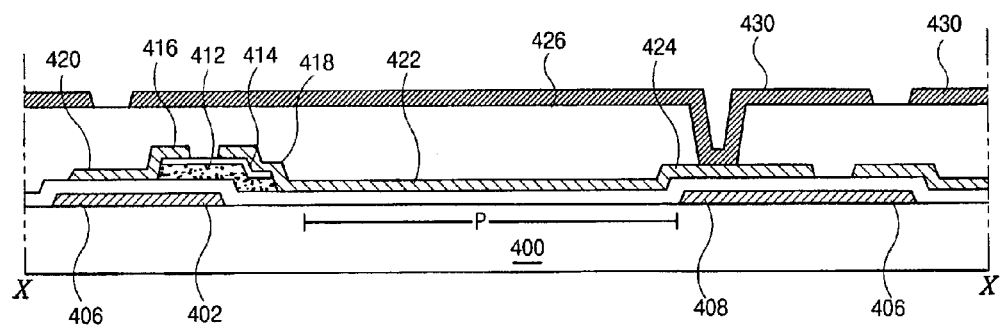
Figure 11D:
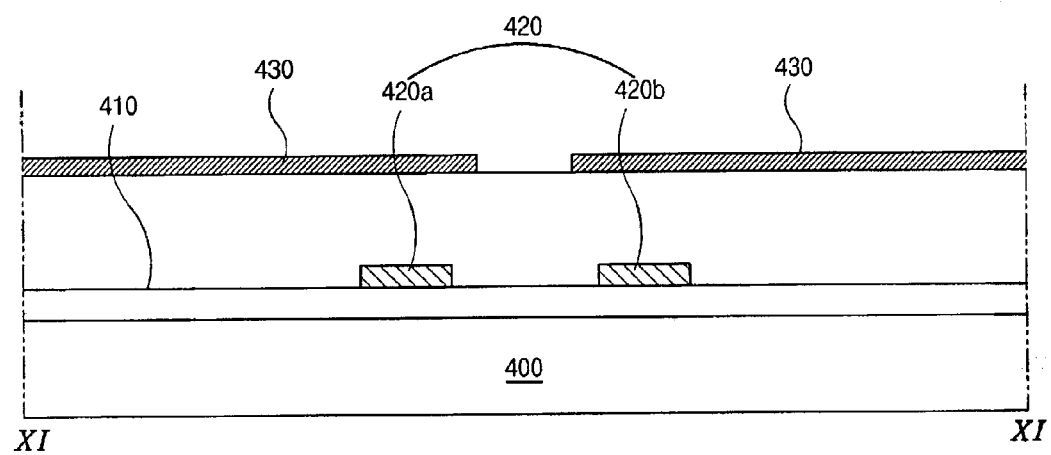

In FIGS. 10E and 11D, a reflective electrode 430 is formed on the passivation layer 426. The reflective electrode 430 is located in the pixel region "P4" and connected to the second capacitor electrode 424 through the contact hole 428. The reflective electrode 430 is formed of a reflective metallic material, such as aluminum and an aluminum alloy. Alternatively, an array substrate has a structure such that a floating reflective plate is formed at the pixel region and a transparent electrode connected to the second capacitor electrode is formed over or under the floating reflective plate.

Since a black matrix corresponding to a space between the adjacent reflective electrodes is not required, the total area of the black matrix can be reduced and luminance can be improved. Moreover, since the ambient light passes through the space between the adjacent reflective electrodes without reflection, a color-mixing phenomenon between the adjacent reflective electrodes can be prevented and a high contrast ratio can be obtained.

Consequently, in the array substrate according to the present invention, since the data line is formed under the reflective electrode, light leakage caused by a scattering of ambient light at the data line is prevented. Moreover, since ambient light passes through the space between the adjacent reflective electrodes without reflection, an additional black matrix corresponding to the region is not required. Therefore, an aperture ratio is improved, and high luminance and a high contrast ratio can be obtained.

It will be apparent to those skilled in the art that various modifications and variations can be made in the reflective liquid crystal display device and the fabricating method thereof of the present invention without departing from the spirit or scope of the inventions. Thus, it is intended that the present invention covers the modifications and variations of this invention provided they come within the scope of the appended claims and their equivalents.

What is claimed is:

1. A reflective liquid crystal display device, comprising:
   a substrate having a pixel region;
   a gate line on the substrate;
   a thin film transistor connected to the gate line for a first pixel region, the thin film transistor having a gate electrode, an active layer, and source and drain electrodes;

first and second reflective electrodes separated by a gap extending along a first direction, the second reflective electrode connected to the drain electrode of the thin film transistor for the pixel region; and a data line connected to the thin film transistor for the pixel region and crossing the gate line, the data line including first, second, and third portions defining a generally serpentine shape, wherein the first and third portions extend along the first direction while the second portion extends along a second direction that is generally perpendicular to the first direction and connected to the first and third portions, the first reflective electrode covering at least the first portion disposed on the first reflective electrode side of the gap and the second reflective electrode covering at least the third portion disposed on the second reflective electrode side of the gap.

2. The reflective liquid crystal display device according to claim 1, wherein the first portion of the data line has the same area as the third portion.

3. The reflective liquid crystal display device according to claim 1, wherein the gate electrode and the source electrode are connected to the gate line and the data line, respectively.

4. The reflective liquid crystal display device according to claim 1, wherein the first and second reflective electrodes are formed of one of aluminum and an aluminum alloy.

5. The reflective liquid crystal display device according to claim 1, wherein the first and second reflective electrodes have an uneven shape.

6. The reflective liquid crystal display device of claim 1, wherein the gap between the first and second reflective electrodes is smaller than a length of the second portion of the data line.

7. The reflective liquid crystal display device according to claim 1, wherein the gate electrode and the source electrode are connected to the gate line and the third portion of the data line, respectively.

8. The reflective liquid crystal display device according to claim 1, wherein the data line further includes fourth and fifth portions, wherein the fourth portion extends in the second direction and the fifth portion extends in the first direction, the first reflective electrode covering fifth portion disposed on the same side of the gap as the first portion.

9. The reflective liquid crystal display device according to claim 8, wherein the gate electrode and the source electrode are connected to the gate line and the fifth portion of the data line, respectively.

10. A method for fabricating a reflective liquid crystal display device, comprising:

forming a gate line on a substrate;

forming a data line crossing the gate line to define a pixel region, the data line including first, second, and third portions defining a generally serpentine shape, wherein the first and third portions are formed along a first direction while the second portion is formed along a second direction that is generally perpendicular to the first direction and connected to the first and third portions;

forming a thin film transistor connected to the gate line and the data line for the pixel region, the thin film transistor comprising a gate electrode, an active layer, and source and drain electrodes; and forming first and second reflective electrodes separated by a gap extending in the first direction, the second reflective electrode connected to the drain electrode of the thin film transistor for the pixel region, wherein the first reflective electrode is formed over at least the first portion disposed on the first reflective electrode side of the gap and the second reflective electrode is formed over at least the third portion disposed on the second reflective electrode side of the gap.

11. The method according to claim 10, wherein the gap between the first and second reflective electrodes is smaller than a length of the second portion of the data line.

12. The method according to claim 10, wherein the first portion has the same area as the third portion.

13. The method according to claim 10, wherein the gate electrode and the source electrode are connected to the gate line and the data line, respectively.

14. The method according to claim 10, wherein the first and second reflective electrodes are formed of one of aluminum and an aluminum alloy.

15. The method according to claim 10, wherein the first and second reflective electrodes have an uneven shape.

16. The method according to claim 10, wherein the gate electrode and the source electrode are connected to the gate line and the third portion of the data line, respectively.

17. The method according to claim 10, wherein the data line further includes fourth and fifth portions, wherein the fourth portion extends in the second direction and the fifth portion extends in the first direction, the first reflective electrode covering fifth portion disposed on the same side of the gap as the first portion.

18. The method according to claim 17, wherein the gate electrode and the source electrode are connected to the gate line and the fifth portion of the data line, respectively.

* * * * *

UNITED STATES PATENT AND TRADEMARK OFFICE
CERTIFICATE OF CORRECTION

PATENT NO. : 7,242,452 B2  
APPLICATION NO. : 10/420786  
DATED : July 10, 2007  
INVENTOR(S) : Woo-Nam Jeong et al.

Page 1 of 1

It is certified that error appears in the above-identified patent and that said Letters Patent is hereby corrected as shown below:

Title Page

Item (30), Foreign Application Priority Data, should read:

--Jul. 31, 2002     (KR) ……………….. 10-2002-0045132--

Signed and Sealed this

Fourth Day of March, 2008

JON W. DUDAS  
*Director of the United States Patent and Trademark Office*